United States Patent
Rehkemper et al.

[19]

[11] Patent Number: 6,146,237
[45] Date of Patent: Nov. 14, 2000

[54] TOY FINGER OPERATED BICYCLE

[76] Inventors: Steven Rehkemper, 1030 N. State St. Apt. 29E; Jeffrey Rehkemper, 329 W. Evergreen, both of Chicago, Ill. 60610; Peter Greenley, 689 N. Milwaukee Ave., Chicago, Ill. 60622; Joseph Masibay, 839 W. Cornelia, Chicago, Ill. 60657

[21] Appl. No.: 09/350,728

[22] Filed: Jul. 9, 1999

[51] Int. Cl.[7] .......................... A63H 17/16; F16D 63/00
[52] U.S. Cl. .............................................. 446/440; 188/68
[58] Field of Search .................... 280/283, 281.1, 280/288.1, 288.2, 288.3, 267, 282, 294; 446/440, 441, 286, 279, 280, 288, 491; 188/24.11, 24.12, 24.22; D12/111; 273/442; 434/61

[56] References Cited

U.S. PATENT DOCUMENTS

| | | | |
|---|---|---|---|
| 633,266 | 9/1899 | Jamieson | 188/24.12 |
| 2,568,374 | 9/1951 | Thomas | 446/440 |
| 2,787,970 | 4/1957 | Bennett | 446/440 |
| 3,712,359 | 1/1973 | Williams | 446/440 |
| 3,826,038 | 7/1974 | Gentilini | 446/440 |
| 4,033,433 | 7/1977 | Kirk | 188/24 |
| 4,582,178 | 4/1986 | Huneault | 188/109 |

*Primary Examiner*—Kien T. Nguyen
*Assistant Examiner*—Urszula M. Cegielnik

[57] ABSTRACT

A toy bicycle that is a scale model including frame, seat, handlebar, front and rear wheel and drive assemblies comparable to a full-sized bicycle. There is also included front and rear braking mechanisms that can be readily and easily finger operated. The bicycle includes pedal and foot pegs that are oversized relative to the other components to facilitate finger operation of the bicycle. The handlebar is provided with projections to enable one playing with it to perform stunts.

13 Claims, 5 Drawing Sheets

TOY FINGER OPERATED BICYCLE

BACKGROUND OF THE INVENTION

Bicycles have long been a popular means of transportation for children and adults. Younger children although not old enough to ride are also very fascinated by bikes and while small toy-like plastic versions have been around they do not truly resemble a typical bicycle since they do not have the various moving parts such as moving wheels, pedals, brakes, sprockets, belts etc. so that the toy bicycle truly simulates a bicycle they see their brothers, sisters and friends riding down the street. Thus, there has long been a need for an essentially true-scale model of a bicycle so that one not old enough to ride can pretend and play with a bicycle very much like his older brother and sister. The toy bike must be capable of being operated by ones finger to pedal the bicycle, apply brakes to the front or rear wheels, do "wheelies" which consists of pulling the front wheel of the ground and riding on the rear wheel and other tricks and movements one can do on a full-sized bicycle.

SUMMARY OF THE INVENTION

In accordance with the present invention there is illustrated and disclosed a bicycle that in a preferred embodiment is essentially a toy size such as a $1/15^{th}$ version of a full-sized bicycle that is capable of being operated like a regular bicycle by ones fingers. It contains the basic parts of a bicycle such as front and rear tire wheels; pedals, sprockets and a belt drive assembly for the rear wheel, seat, handle bars and frame and novel front and rear brake assemblies so that one playing with the toy bike can do everything one riding a regular bicycle is doing.

The foregoing and other objects, features and advantages of the present invention will become apparent from the following description.

DETAILED DESCRIPTION OF THE PREFERRED EMBODIMENT

Figure 1:
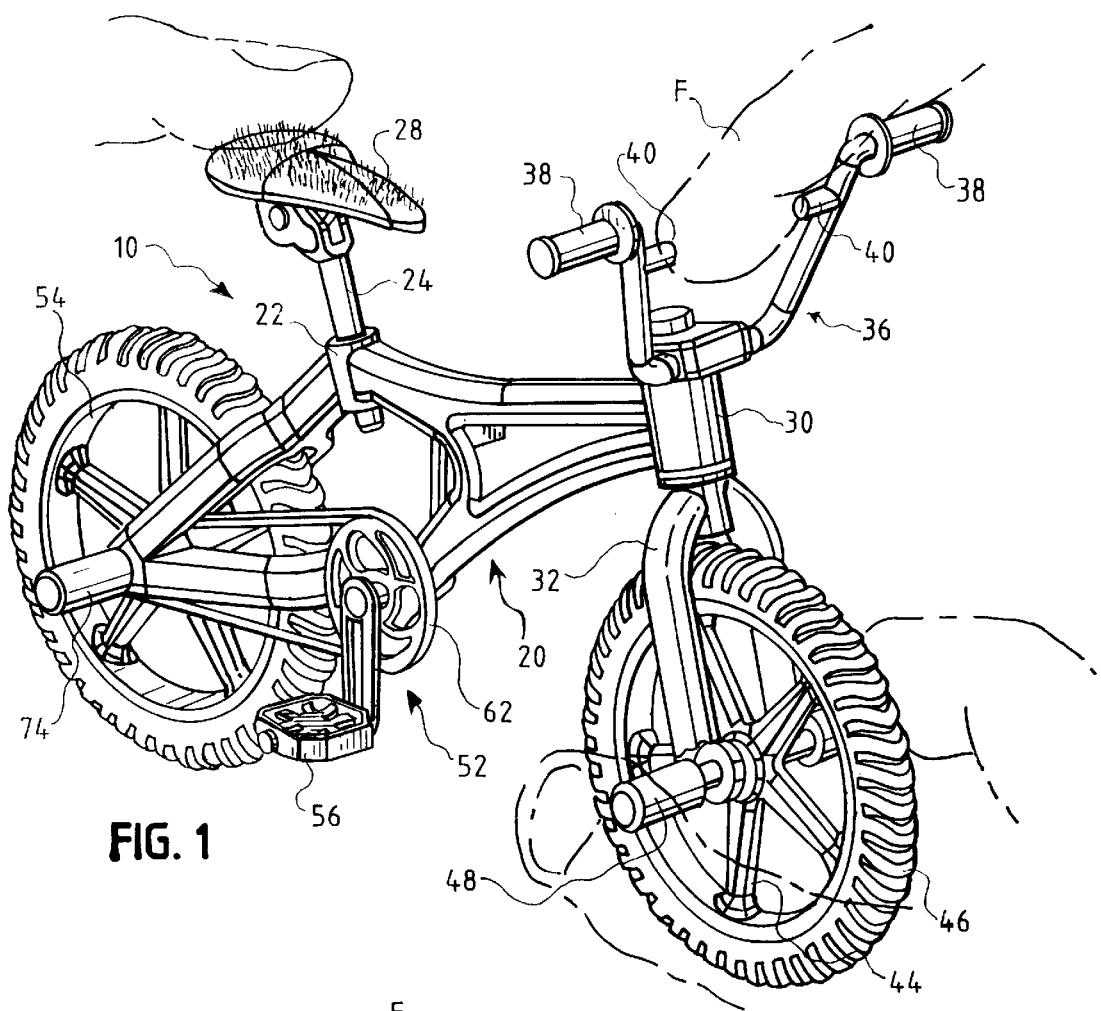
FIG. 1 is a perspective view of a toy scale version of a typical bicycle.

The present invention as illustrated in perspective in FIG. 1 is approximately a $1/15^{th}$ scale replica of bicycles having features for accommodating the fingers of the user in order to control the bike and perform tricks and/or stunts. While a preferred embodiment has been illustrated other accessories may be provided and may be included in play sets along with the basic features of a bicycle.

Figure 2:
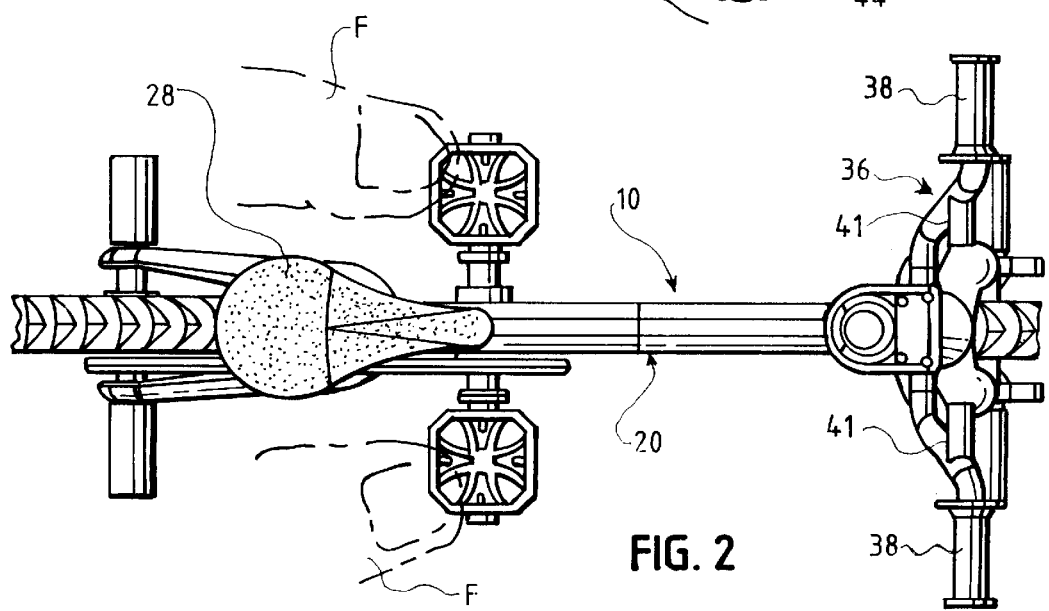
FIG. 2 is a plan view of the bicycle of FIG. 1.
Figure 3:
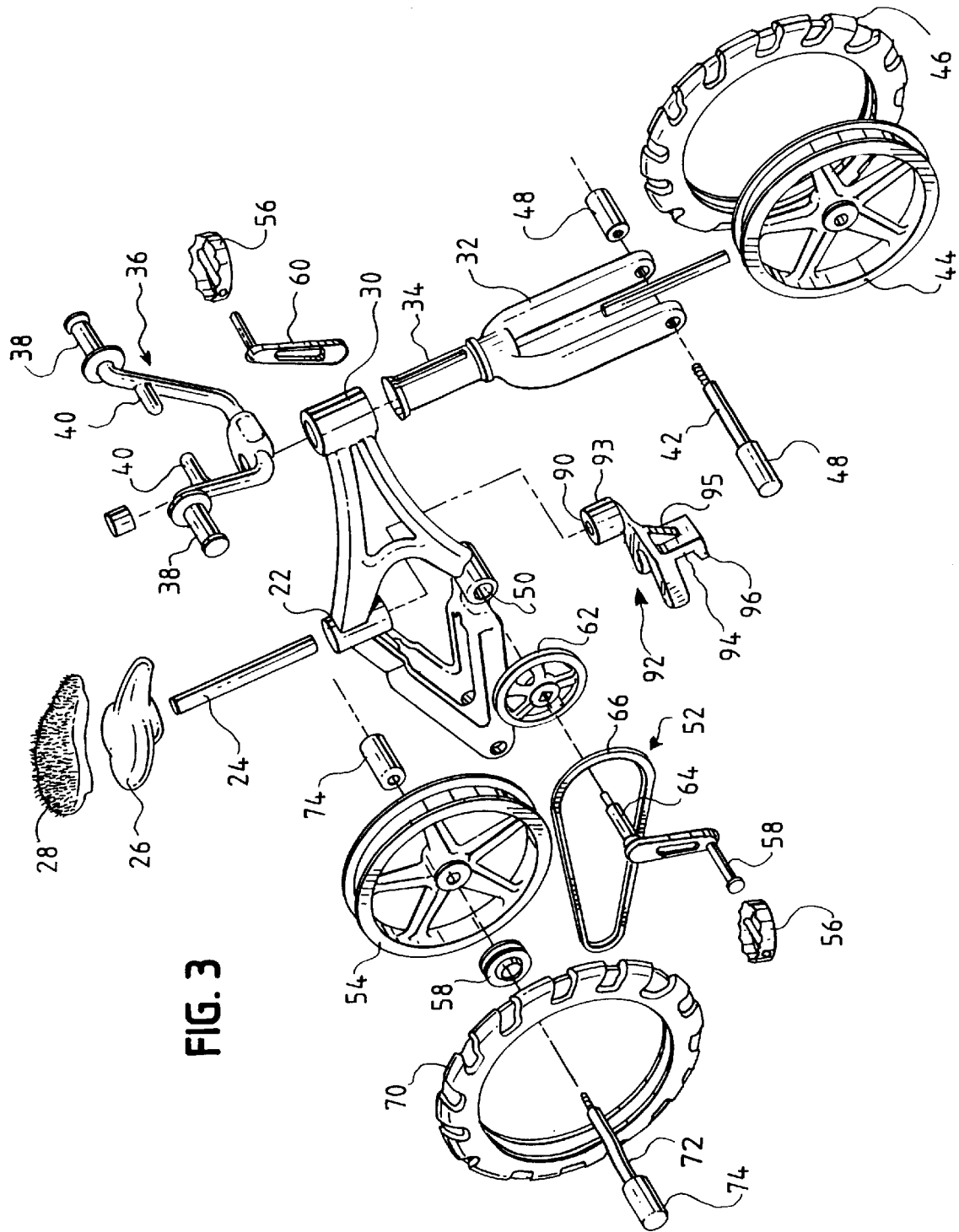
FIG. 3 is an exploded view of the component parts of the bicycle of FIG. 1.

The component parts of the bicycle 10 can best be understood by reference to the exploded view thereof shown in FIG. 3 in conjunction with FIGS. 1 and 2. Other features such as the front and rear brake assemblies will be dealt with when discussing FIGS. 4–10.

It is intended that the bicycle is finger operated and in describing the various components of the bike the features that facilitate the finger operation will be described in greater detail.

As illustrated in FIG. 3 the bike consists of a main frame member 20 that includes a tubular portion 22 that is designed to slidably and frictionally receive one end of a seat post 24. The other end of the seat post 24 securely receives a seat 26. That seat 26 is fitted with a seat cover 28 that is made of rubber or some other high frictional material so that one placing a finger F thereon such as shown in FIG. 1 the finger will readily grip and move the bike.

Figures 4, 5:
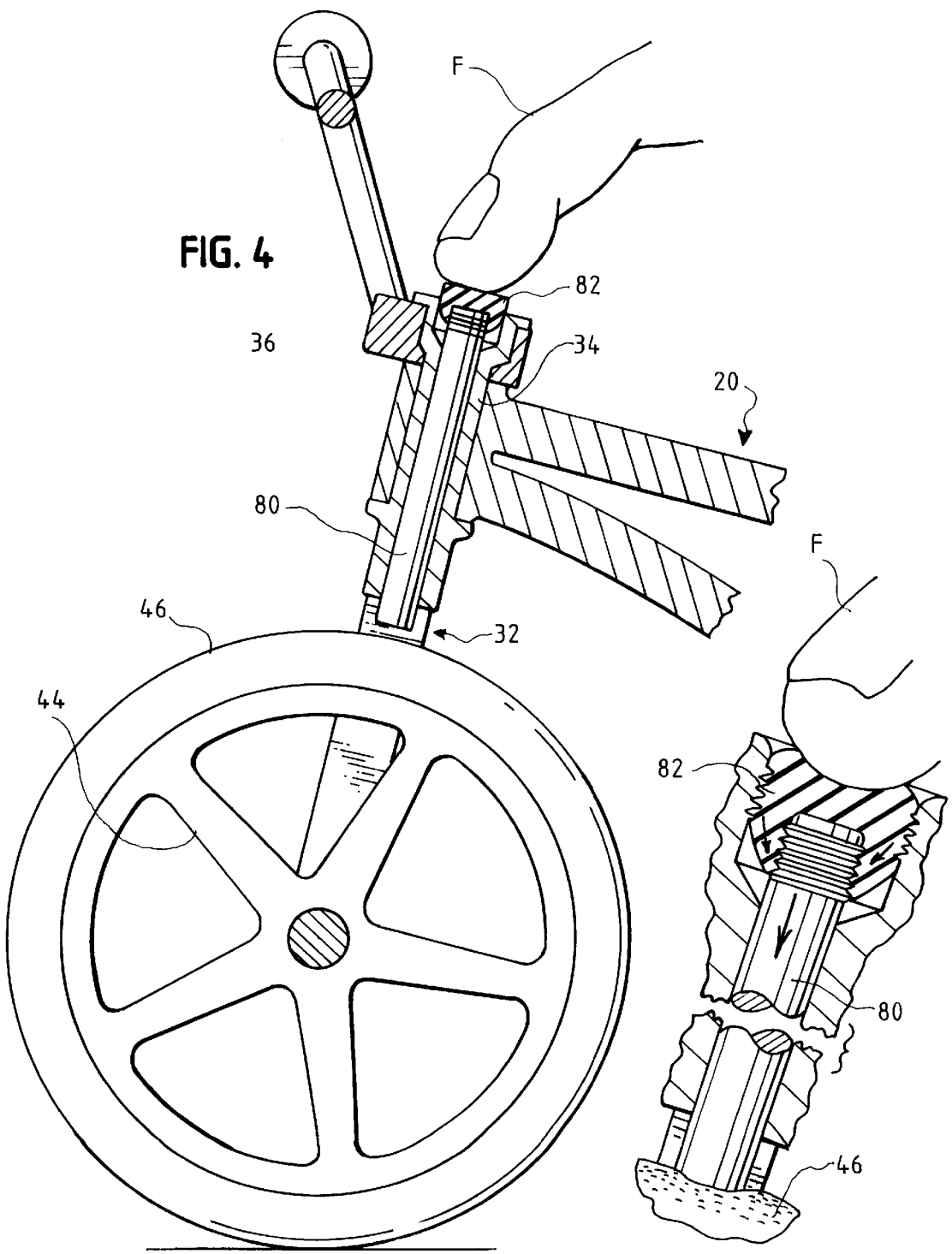
FIG. 4 is an enlarged sectional view of the front wheel braking mechanism.
FIG. 5 is a further enlarged view of the brake shown in FIG. 4.

Secured to the tubular post 30 is a fork member 32 that at its upper end has a tubular extension 34 that fits into the tubular post 30 as shown in FIG. 4. Within the tubular extension 34 is located a front braking member which will be described in greater detail with respect to FIGS. 4 and 5.

Also, secured to the tubular extension 34 as shown in FIG. 4 is the handle bar assembly 36. The handle bar assembly 36 included handgrips 38 and also has inwardly extending projections 40. As shown in FIG. 1 these projections may be engaged by a finger F to raise the front wheel and thus perform a "wheelie" that is a stunt that one sees an expert bike rider do to impress his friends. In place of the projection a single curved bar could be used if desired Connected to the fork member 32 at its lower end by an axle 42 is a wheel 44 on which is located a tire 46 having a soft gripping surface. Threadly secured to the ends of the axle 42 are oversized foot pegs 48 so that one can finger grip the axle and move the bike as shown in FIG. 1

Secured to the horizontally disposed tubular support 50 at the midsection of frame 20 is a pedal-crank-axle-sprocket assembly 52 that when operated will drive the rear wheel 54 in a manner to be later described.

The pedal-crank-axle-sprocket assembly includes oversized pedals 56, which facilitate finger actuation as shown in FIG. 2. A pedal 56 is connected to right crank 58 and also to left crank 60. Connected to the cranks 58, 60 and drivingly connected to a front sprocket 62 and cranks and extending through the tubular support 50 is an axle 64. The sprocket 62 drives the rear wheel 54 through the connected belt 66 and sprocket 68. The sprocket 68 is connected to the wheel 54 covered by tire 70 by the rear axle 72. Connected to the ends of the axle 72 are rear pegs 74, which are oversized to facilitate finger gripping thereof to drive the bicycle.

Having now described the various structural components of the toy bicycle reference is made to FIGS. 4–12, which disclose details of the novel braking systems for the front and rear wheels.

Referring now to FIGS. 4 and 5 there is illustrated the novel braking system for applying a stopping action to the front wheel 44. The essence of the system is to push down on a brake pin 80 to engage the tire 46 to stop the wheel 44 and thus the bicycle. When one releases the brake pin 80 it will become disengaged and the brake is no longer applied. In the illustrated embodiment a resilient plug 82 is connected to the pin and when pushed down as shown in FIG. 5 the tire is engaged and when released will return to the position shown in FIG. 4 where it is disengaged from the tire. Other equivalent systems could be used. In FIGS. 6–10 there is illustrated one of two novel rear braking assemblies. In the preferred embodiment wherein the frame is relatively rigid the rear brake is actuated by movement of the seat and seat post. Another type of rear braking system is also illustrated such as a member secured to the frame and positioned to engage the rear wheel when a flexible frame is flexed as shown in FIGS. 11 and 12.

Figure 6:
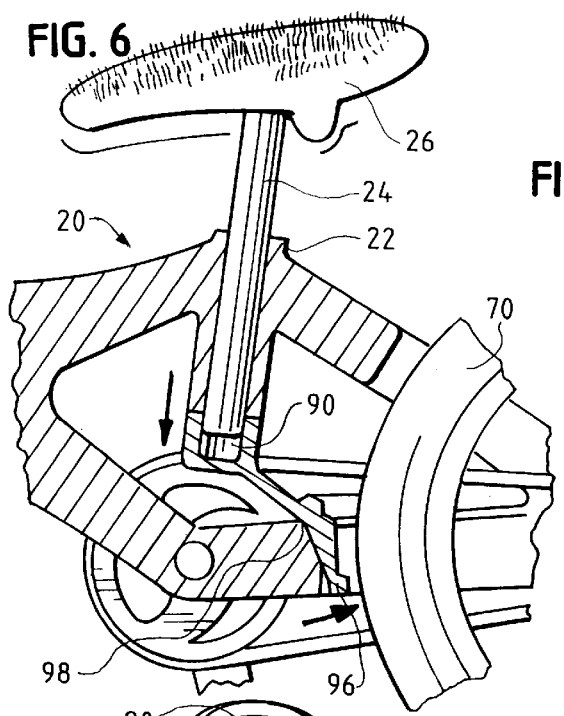
FIG. 6 is an enlarged sectional view of the rear wheel braking mechanism showing the brake disengaged.
Figure 7:
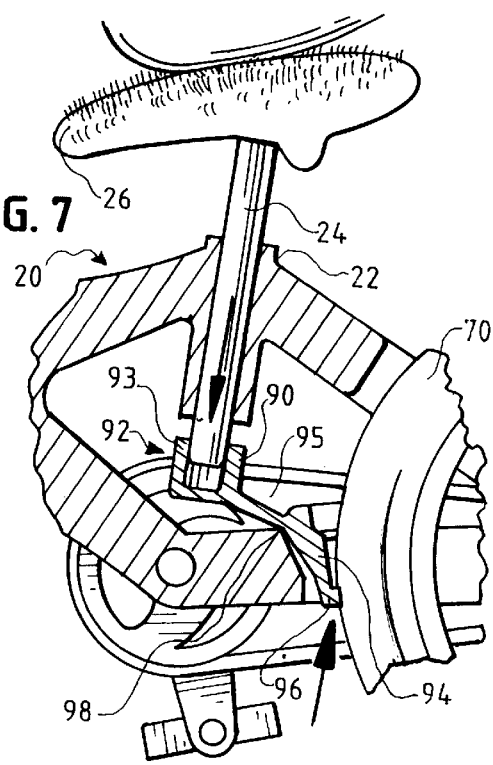
FIG. 7 is a view similar to FIG. 6 showing the brake engaged.
Figures 8, 9:
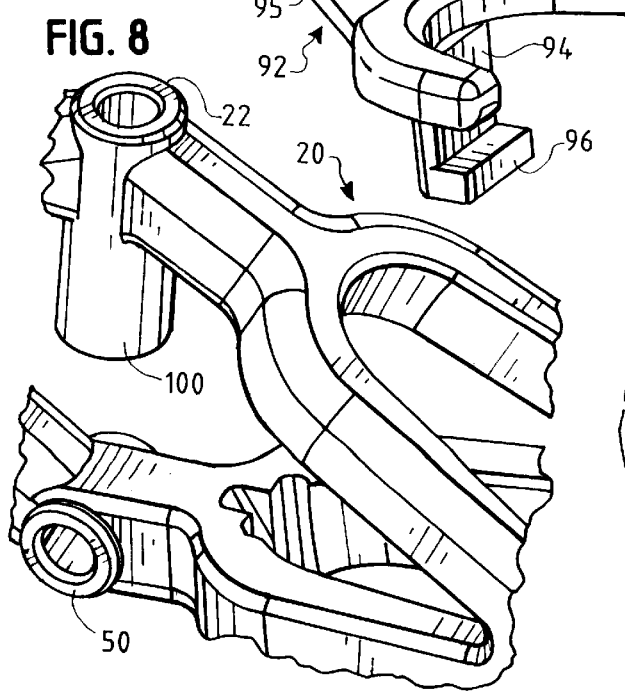
FIG. 8 is a partial view of the main frame.
FIG. 9 is a perspective view of the brake member.
Figure 10:
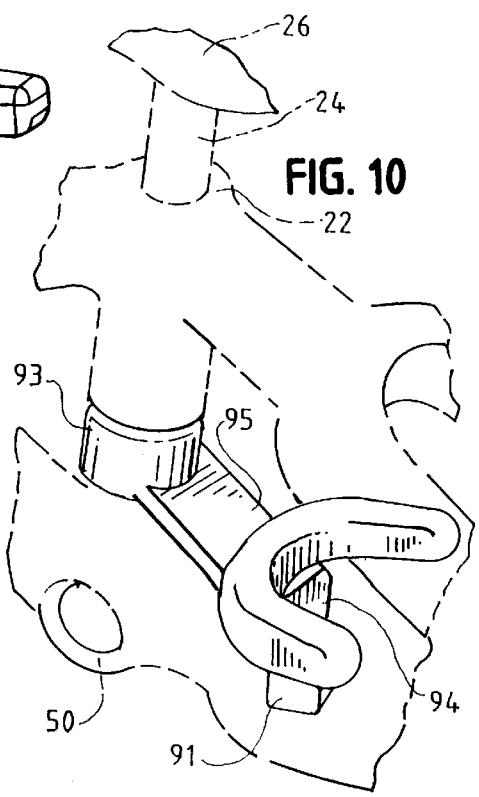
FIG. 10 is a perspective view of the brake member of FIG. 9 installed relative to the frame.

Essentially, the seat post 24 extends through the tubular portion 22 and fits tightly into a recess 90 formed in the braking member 92 (see FIG. 6). The braking member 92 includes an upstanding tubular section 93 and a downwardly projecting member 94 connected to section 93 by plate 95. Member 94 has a braking pad 96 secured to its lower end. This when the seat 26 and seat post 24 are pushed downwardly as shown in FIG. 7 the member 92 will fulcrum about the frame 20 at 98 to move the braking pad 96 into engagement with the tire 70 to stop wheel 54. It is noted that downwardly projecting member fits into slot 100 in frame 20 to prevent the seat post 24 and seat 26 from rotating. When the finger is removed from the seat the resilience of the braking member which in the illustrated embodiment is plastic will return the braking member to the disengaged position as shown in FIG. 6.

Figure 11:
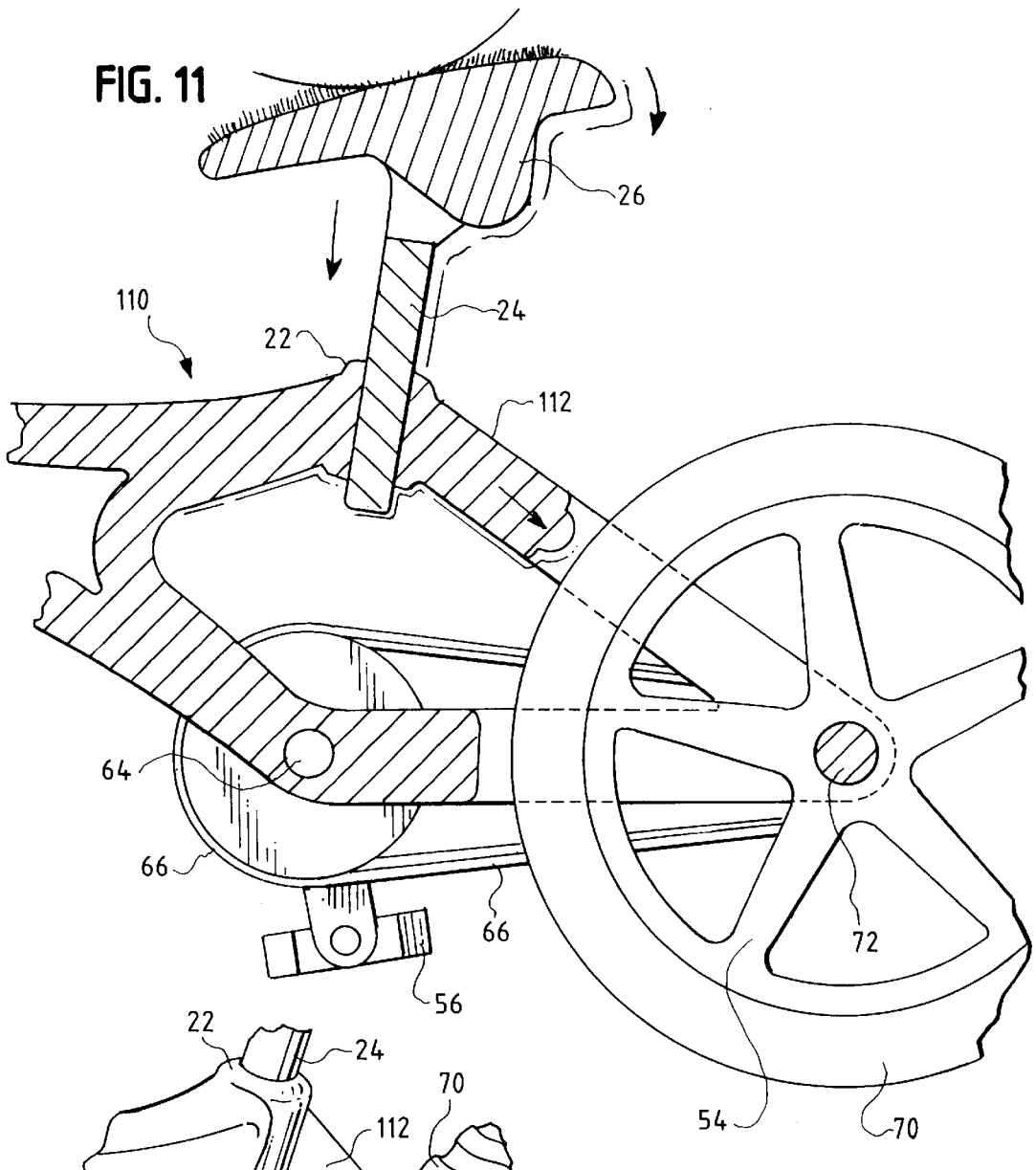
FIG. 11 is another embodiment of a novel rear braking system.
Figure 12:
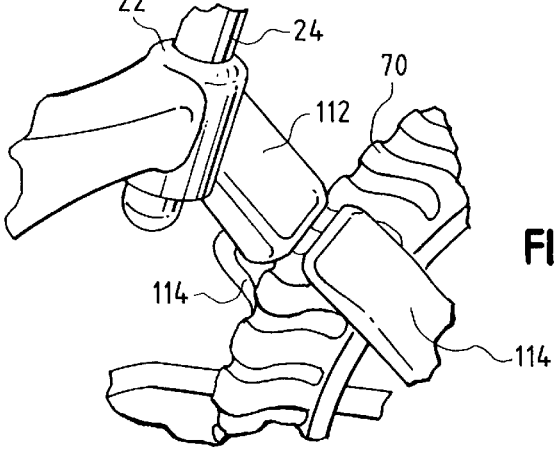
FIG. 12 is a detailed view of the braking system of FIG. 11.

In the rear braking embodiment illustrated in FIGS. 11 and 12 the frame 110 is considered to be a flexible frame in which the seat 26 is on the seat post 24 that fits into tubular portion 22.

Extending from the tubular portion 22 at the upper intermediate portion of the maid frame 110 is a downwardly depending member 112. The depending member 112 extends between tow upwardly extending spaced arms 114 of the maid frame 110 surrounding the tire 70 (FIG. 7). The frame 110 is sufficiently flexible whereby applying downward pressure on the seat 26 as shown in FIG. 11 the end of member 112 engages tire 70 to stop wheel 54. Removing one's finger from the seat 26 will result in frame 20 returning to its unflexed position and member 112 moving away from the tire to release the braking action.

It is intended to cover by the appended claims all modifications and features which fall within the true spirit and scope of the invention.

What is claimed is:

1. A finger operated toy bicycle comprising a frame assembly, seat, handlebar, front and rear wheel and drive assemblies operatively connected to said frame assembly, the seat assembly including a seat and a seat post extending through a tubular portion defined by said frame, a rear wheel braking mechanism secured to said seat post and positioned to engage said rear wheel when said seat post is moved downwardly whereby when the seat is moved downwardly said seat post will move said rear wheel braking mechanism into engagement with said rear wheel to stop it from turning.

2. A finger operated toy bicycle comprising a frame assembly, seat, handlebar, front and rear wheel and drive assemblies operatively connected to said frame assembly, a front wheel braking mechanism connected to the front of the frame assembly and including a braking pin resiliently mounted in said frame adjacent said front wheel assembly whereby when said pin is engaged it will contact the front wheel assembly to stop it and when released will become disengaged therefrom.

3. A toy bicycle comprising a frame assembly, seat, handlebar, front and rear wheel and drive assemblies operatively connected to said frame assembly, the seat assembly including a seat and a seat post extending through a tubular portion defined by said frame, a rear wheel braking mechanism secured to said seat post and positioned to engage said rear wheel when said seat is moved downwardly, and a front wheel braking mechanism connected to the front of the frame assembly and including a braking pin resiliently mounted in said frame adjacent said front wheel whereby the rear wheel can be braked by flexing the frame downwardly to engage said member with the rear wheel assembly and the front wheel can be braked by pressing the resiliently mounted braking pin against the front wheel.

4. A toy bicycle as set forth in claim 1 in which the rear braking mechanism includes a member defining a recess into which said seat post extends and the opposite end of said member defines a brake pad positioned to engage said wheel, said member being positioned to fulcrum about said frame whereby when the seat post moves downwardly the member fulcrums about said frame and moves the brake pad into engagement with said rear wheel.

5. A toy bicycle as set forth in claim 4 in which the frame defines a recess and said member defines a cooperating portion that fits into said recess whereby the member can not rotate and therefore the seat and seat post can only move longitudinally.

6. A toy bicycle as set forth in claim 2 in which the front wheel assembly is connected to a tubular post defined by the frame assembly by a fork member having a tubular extension that extends through said tubular post and the braking pin is disposed within said tubular extension.

7. A toy bicycle as set forth in claims 1, 2 or 3 in which the seat assembly includes a seat cover made of a high function material comprising a rubber or soft polyvinyl chloride whereby it can be readily gripped and finger operated.

8. A toy bicycle as set forth in claims 1, 2 or 3 in which the front and rear wheel assemblies include axles and oversized foot pegs secured thereto whereby the wheels can be readily gripped and rotated to drive the bicycle.

9. A toy bicycle as set forth in claims 1, 2 or 3 in which the pedals are oversized relative to the other components of the bicycle whereby they can be easily and readily finger operated.

10. A toy bicycle as set forth in claims 1, 2 or 3 in which the handlebar assembly includes inwardly disposed projections whereby the handlebars can be easily and readily finger-gripped to manipulate the bicycle to perform any of a variety of tricks or stunts.

11. A toy bicycle as set forth in claims 1, 2 or 3 in which the front and rear wheel assemblies include soft tires to provide an increased gripping surface.

12. A bicycle as set forth in claim 10 in which the handlebar is provided with inwardly extending projections to be finger gripped to perform stunts with the bicycle.

13. A finger operated toy bicycle comprising a flexible assembly, seat, handlebar, front and rear wheel and drive assemblies operatively connected to said frame assembly, a rear wheel braking mechanism including a member depending from said frame and positioned to engage said rear wheel upon flexing of said frame assembly whereby when the frame is flexed downwardly said member will engage said rear wheel to stop it from turning.

* * * * *